(12) United States Patent
Jan et al.

(10) Patent No.: US 7,674,063 B2
(45) Date of Patent: Mar. 9, 2010

(54) ROTATABLE JOINT HAVING A RESILIENT MODULE

(75) Inventors: Te-Sheng Jan, Taipei Hsien (TW);
Yu-Tao Chen, Taipei Hsien (TW);
Chun-Che Yen, Taipei-Hsien (TW);
Zheng-Qiang Song, Shenzhen (CN);
Gang Cheng, Shenzhen (CN);
Bing-Jing Xu, Shenzhen (CN);
Meng-Hua He, Shenzhen (CN);
Jian-Jun Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 119 days.

(21) Appl. No.: 11/957,496

(22) Filed: Dec. 17, 2007

(65) Prior Publication Data
US 2009/0060641 A1  Mar. 5, 2009

(30) Foreign Application Priority Data
Aug. 31, 2007  (CN) .................. 2007 1 0201549

(51) Int. Cl.
*F16C 11/00* (2006.01)
(52) U.S. Cl. ................ 403/145; 403/120; 403/123; 403/142; 403/143; 403/156
(58) Field of Classification Search .............. 403/119, 403/120, 122, 123, 137, 141, 142, 143, 144, 403/145, 148, 150, 154, 156, 157; 464/112
See application file for complete search history.

(56) References Cited

U.S. PATENT DOCUMENTS

| | | | | | |
|---|---|---|---|---|---|
| 2,694,585 | A | * | 11/1954 | Fiori | 403/120 |
| 3,333,876 | A | * | 8/1967 | Chow | 403/144 |
| 3,362,671 | A | * | 1/1968 | Johnson | 403/148 |
| 3,409,315 | A | * | 11/1968 | Wichers et al. | 285/153.3 |
| 5,398,978 | A | * | 3/1995 | Gagnon | 403/145 |
| 5,702,197 | A | * | 12/1997 | Chen | 403/166 |

* cited by examiner

*Primary Examiner*—Michael P Ferguson
(74) *Attorney, Agent, or Firm*—Frank R. Niranjan

(57) ABSTRACT

An exemplary rotatable joint (100) used for a mechanical device includes a socket (10), a rotatable arm (20), a supporting shaft (13), a fastening member (15), an adjusting member (16), and a resilient module (18). A pivot hole (212) is defined in the rotatable arm. The supporting shaft includes a first shaft portion (130) and a second shaft portion (132). A threaded hole (131) is defined in the first shaft portion and the first shaft portion extends through the pivot hole. The second shaft portion is fixed to the socket. The fastening member includes a threaded portion (152) for engaging in the threaded hole of the supporting shaft. The adjusting member is disposed at the threaded portion of the fastening member. The resilient module is disposed between the rotatable arm and the adjusting member for providing an axial resilient force. The axial resilient force is fine tuned by moving the adjusting member.

17 Claims, 5 Drawing Sheets

ROTATABLE JOINT HAVING A RESILIENT MODULE

BACKGROUND OF THE INVENTION

1. Field of the Invention

The present invention generally relates to joints, and more particularly, to a rotatable joint which has a resilient module.

2. Discussion of the Related Art

Rotatable joints afford movement for arms of mechanical devices. As such, a mechanical device, having an arm designed for movement, includes a rotatable joint. The rotatable joint may join an arm or an actuating portion to a supporting portion (generally the body) of the mechanical device. In other words, the actuating portion is attached to the supporting portion by the rotatable joint. A typical actuating portion includes a base fixed to the supporting portion, a movable member fixed to the actuating portion, and a pivot shaft for connecting the base and the movable member. A pivot hole is defined in the base, and one end of the pivot shaft is rotatably engaged in the pivot hole. The other end of the pivot shaft is rotatably connected to the movable member by a pin. Thus, the movable member not only can rotate together with the pivot shaft relative to the base, but can also rotate relative to the pivot shaft.

Due to friction, wear and tear of usage, the pivot shaft and the pin of the rotatable joint may become worn out, thus the rotatable joint may become unstable and control of the actuating portion may suffer.

Therefore, a new rotatable joint that is less likely to be worn out, and to be stable over the long term, is desired.

SUMMARY

A rotatable joint includes a socket, a rotatable arm, a supporting shaft, a fastening member, an adjusting member, and a resilient module. A pivot hole is defined in the rotatable arm. The supporting shaft includes a first shaft portion and a second shaft portion. A threaded hole is defined in the first shaft portion. The first shaft portion extends through the pivot hole. The second shaft portion is fixed to the socket. The fastening member includes a threaded portion for engaging in the threaded hole of the supporting shaft. The adjusting member is disposed at the threaded portion of the fastening member. The resilient module is disposed between the rotatable arm and the adjusting member. The resilient module is configured for providing an axial resilient force. The axial resilient force is fine tuned by moving the adjusting member along the threaded portion of the fastening member.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present rotatable joint. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present rotatable joint in detail.

Figure 1:
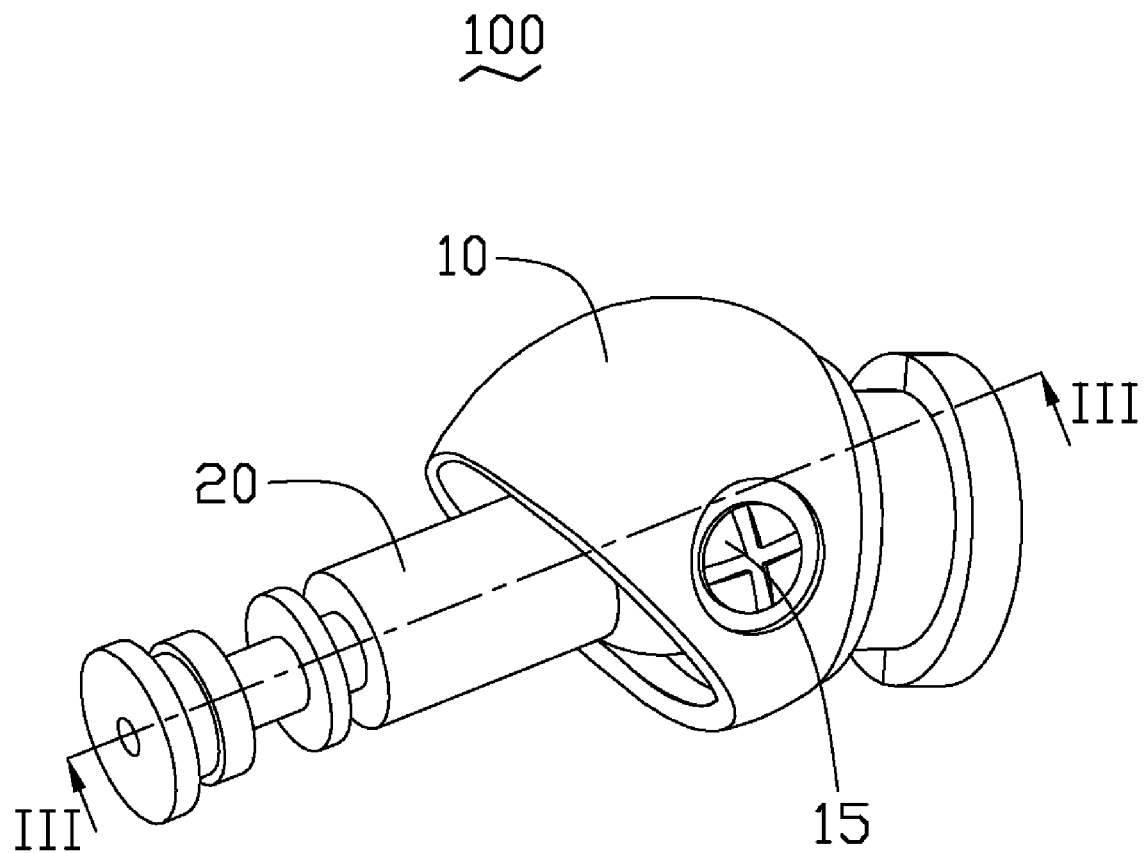
FIG. 1 is an assembled, isometric view of a rotatable joint in accordance with a first embodiment of the present invention.
Figure 2:
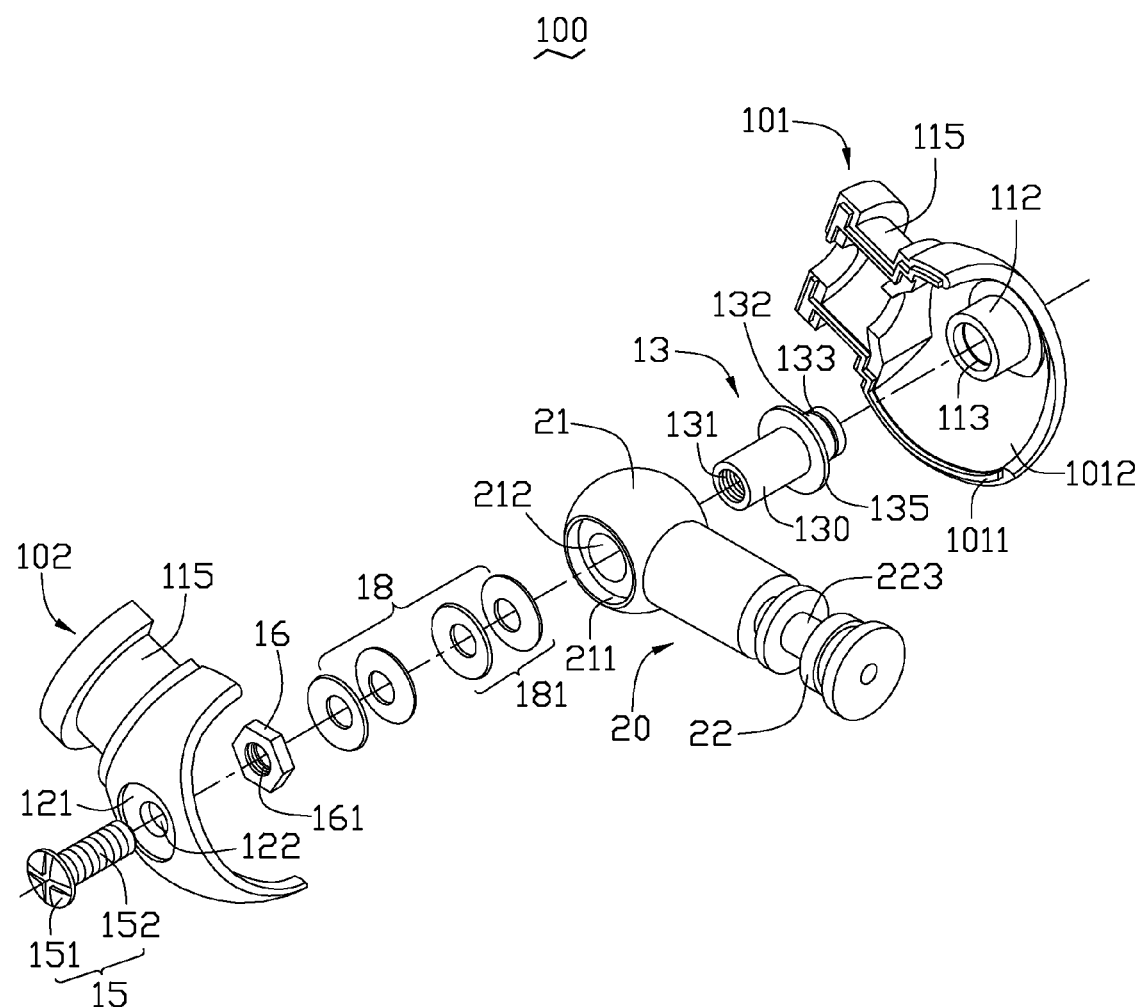
FIG. 2 is an exploded, isometric view of the rotatable joint shown in FIG. 1.

Referring to FIGS. 1 and 2, a rotatable joint 100 in accordance with a first embodiment is shown. The rotatable joint 100 includes a socket 10, a rotatable arm 20, a supporting shaft 13, a fastening member 15, an adjusting member 16, and a resilient module 18.

The socket 10 is substantially a hollow spheroid defining an opening. The socket 10 includes a first half 101 and a second half 102 that collectively form the socket 10. A latching protrusion 1011 is formed on an end surface of the first half 101 and a latching groove (not shown) is defined in an end surface of the second half 102 corresponding the latching protrusion 1011. The latching protrusion 1011 is configured to tightly fitted in the latching groove, thus, fixing the first half 101 and the second half 102 together. The first half 101 includes a shaft receptacle 112 extending from an inner surface 1012 of the first half 101. The shaft receptacle 112 is configured to support the supporting shaft 13. The shaft receptacle 112 is substantially a cylinder with a pivot hole defined therein. The shaft receptacle 112 includes a latching rim 113 around the middle portion of the pivot hole. A through hole 122 and a circular groove 121 communicating with the through hole 122 are defined in the second half 102. The through hole 122 corresponds (symmetrically aligned) to the shaft receptacle 112, i.e., a center of the through hole 122 and a center of the latching rim 113 are aligned along a same line. The socket 10 further includes a fixing portion 115 extending from the first half 101 and the second half 102 correspondingly. The fixing portion 115 is configured to fix the socket 10 to a supporting portion (not shown) of a mechanical device.

The rotatable arm 20 is substantially a shaft. The rotatable arm 20 includes a ball joint 21 and an arm extension 22 extending from the ball joint 21. The ball joint 21 is spherical. Two frictional grooves 211 are defined at opposite sides of the ball joint 21. A pivot hole 212 is defined through a center of the ball joint 21 communicating between the two frictional grooves 211. The pivot hole 212 is configured for the supporting shaft 13 inserted through. An engaging groove 223 is defined around a cylindrical end of the arm extension 22. The engaging groove 223 is configured for rotatably attaching an actuating portion (not shown) of the mechanical device to the rotatable arm 20.

The supporting shaft 13 includes a first shaft portion 130, a second shaft portion 132, and a flange portion 135. The flange portion 135 is disposed between the first shaft portion 130 and the second shaft portion 132. The first shaft portion 130 is a cylinder with a threaded hole 131 defined therein. The second shaft portion 132 is a cylinder, and a latching groove 133 is defined in the second shaft portion 132 corresponding to the latching rim 113 of the first half 101 socket 10. The latching groove 133 is defined around the second shaft portion 132. It should be understood that, the supporting shaft 13 could be soldered to the first half 101. In an alternative embodiment, the supporting shaft 13 can be fixed to the socket 10 with adhesive substances. The supporting shaft 13 can also be integrally made with the socket 10.

The fastening member 15 is substantially a screw and includes a head portion 151 and a threaded portion 152 connected to the head portion 151. The head portion 151 is substantially a circular flange configured for engaging in the circular groove 121 of the second half 102. The threaded portion 152 is a threaded cylinder configured for extending through the through hole 122 of the second half 102 and screwed in the threaded hole 131 of the supporting shaft 13.

The adjusting member 16 is substantially a nut and a threaded hole 161 in the adjusting member 16. The adjusting member 16 can also be other elements such as a washer defining a threaded hole.

The resilient module 18 includes two pairs of resilient rings 181. The resilient rings 181 are generally plate-shaped, and are configured to provide axial resilient force. The pair of resilient rings 181 abut each other, and are oriented symmetrically opposite to each other. It should be understood that the resilient module 18 may only include a pair of rings 181 or more than two pairs of resilient rings 181. The resilient module 18 can also be a spring, or a combination of a spring and a pair of resilient rings 181.

Figure 3:
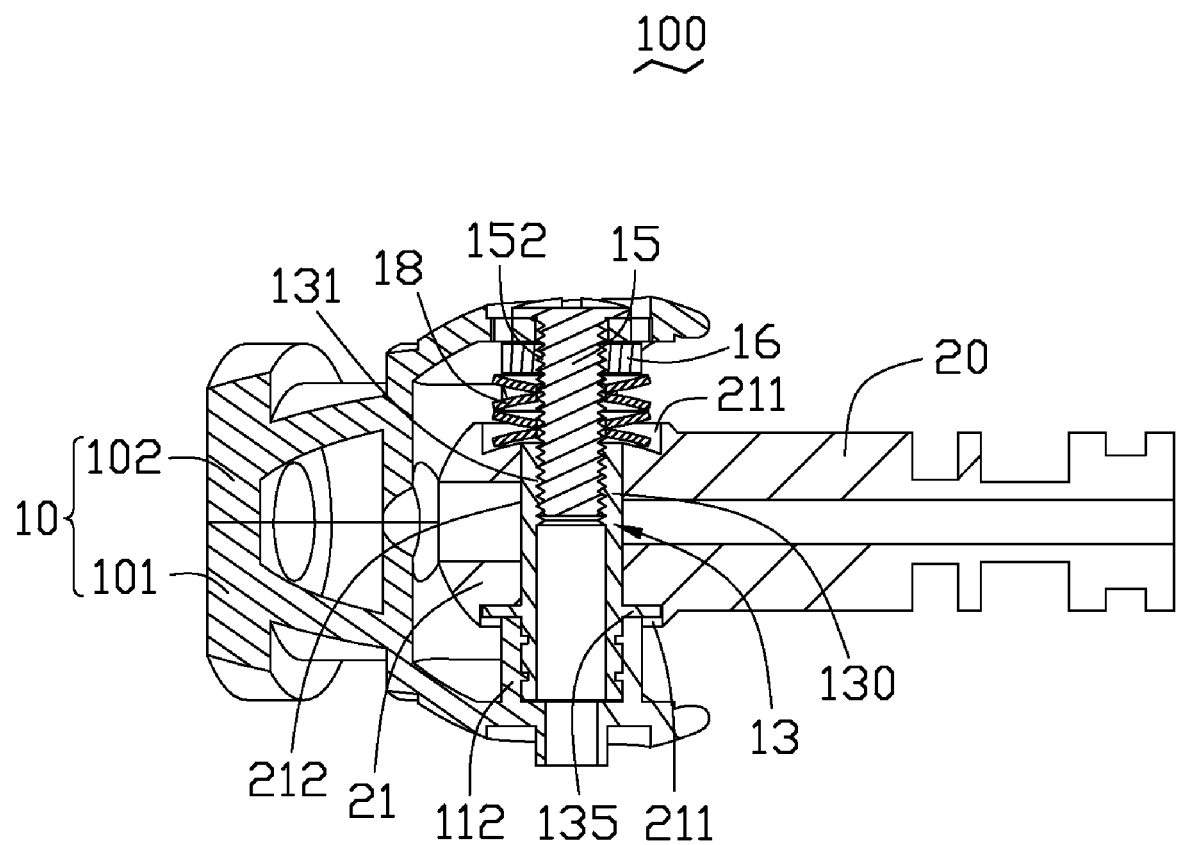
FIG. 3 is a cross-sectional view of the rotatable joint shown in FIG. 1, taken along line III-III thereof.

Referring to FIG. 3, to assemble the rotatable joint 100, the second shaft portion 132 of the supporting shaft 13 is fixed to the shaft receptacle 112 by latching the latching rim 113 in the latching groove 133. The first shaft portion 130 of the supporting shaft 13 is partially inserted into the pivot hole 212 of the rotatable arm 20 with the flange portion 135 engaging in one of the frictional grooves 211. The threaded portion 152 of the fastening member 15 is inserted through the through hole 122 of the second half 102. The adjusting member 16 is sleeved (by screwing) onto the threaded portion 152 of the fastening member 15 by the threaded hole 161 of the adjusting member 16. Part of the resilient rings 181 are received in the other one of the frictional grooves 211 of the rotatable arm 20. The threaded portion 152 of the fastening member 15 extends through the resilient rings 181 and screwed in the threaded hole 131 of the supporting shaft 13. The latching protrusion 1011 is tightly fitted in the latching groove, thus, fixing the first half 101 and the second half 102 together. When the rotatable joint 100 is assembled, the supporting shaft 13 and the fastening member 15 are fixed to the socket 10, and the rotatable arm 20 is rotatable and retainable relative to the supporting shaft 13.

In an alternative embodiment, the resilient module 18 is disposed between the rotatable arm 20 and the flange portion 135 of the supporting shaft 13.

In use, when an external force is applied to the rotatable arm 20, the rotatable arm 20 can be rotated relative to the supporting shaft 13. The resilient module 18 and one of the frictional grooves 211 produce friction, and another one of the frictional grooves 211 and the flange portion 135 of the supporting shaft 13 also produce friction. Thus, the rotatable arm 20 can retain in a position relative to the supporting shaft 13 by friction when the external force is canceled.

When the fixing portion 115 of the socket 10 is fixed to the supporting portion of the mechanical device, and the engaging groove 223 of the rotatable arm 20 rotatably engages with the actuating portion of the mechanical device. The actuating portion of the mechanical device can be rotated relative to the socket 10. The actuating portion of the mechanical device can also be rotated relative to the engaging groove 223 of the rotatable arm 20. Therefore, the mechanical device can obtain different stable using states.

The adjusting member 16 is able to rotate along the threaded portion 152 of the fastening member 15 for tightening or loosing the resilient rings 181 between the rotatable arm 20 and the adjusting member 16. Thus, the axial resilient force provided by the resilient rings 181 is able to be fine tuned by the adjusting member 16. When the axial resilient force provided by the resilient rings 181 is increased, the frictional force for retaining the rotatable arm 20 will be increased. When the axial resilient force provided by the resilient rings 181 is decreased, the frictional force for retaining the rotatable arm 20 will be decreased. Thus, the joint is convenient to tune the frictional force for retaining the rotatable arm 20 so that the mechanical device used the rotatable joint 100 can maintain all kinds of stable use states.

Figure 4:
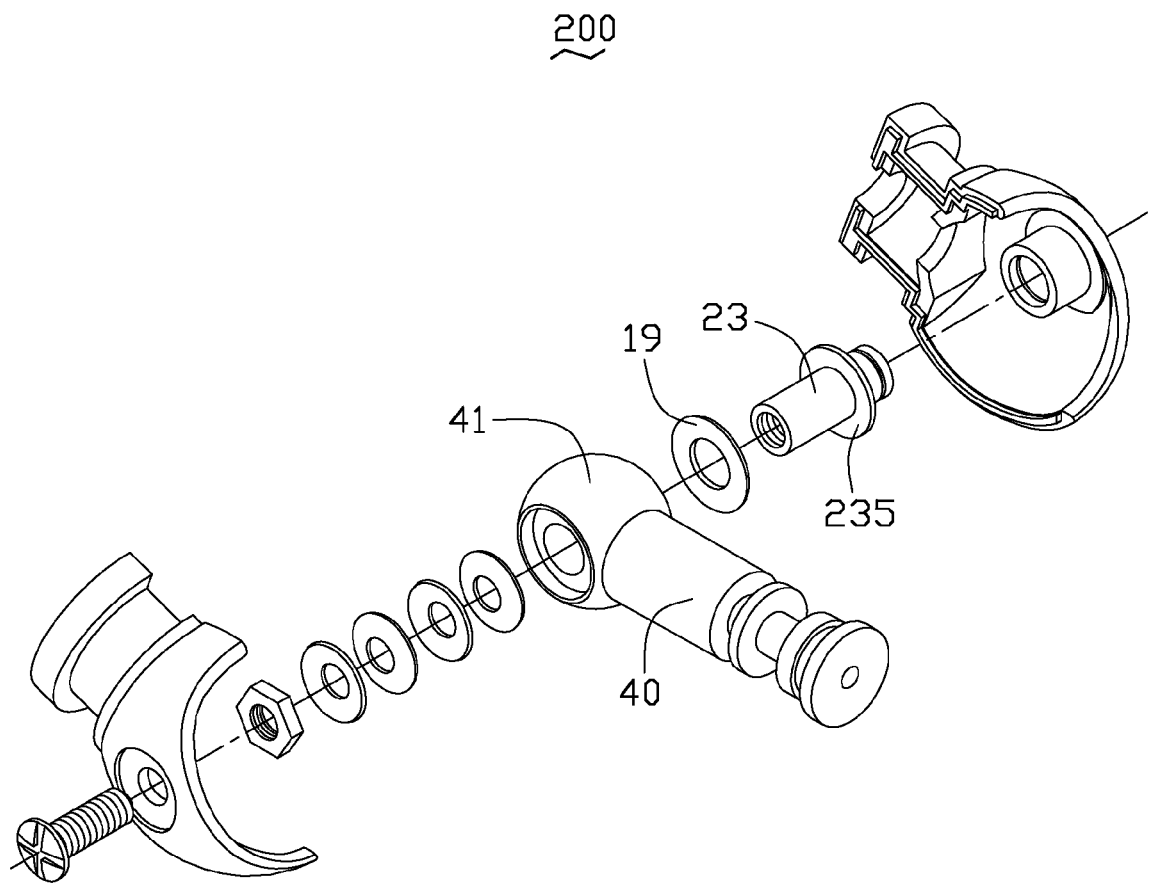
FIG. 4 is an exploded, isometric view of the rotatable joint in accordance with a second embodiment of the present invention.

Referring to FIG. 4, a rotatable joint 200 in accordance with a second embodiment is shown. The rotatable joint 200 includes a rotatable arm 40, and a supporting shaft 23. The rotatable arm 40 includes a ball joint 41 and the supporting shaft 23 includes a flange portion 235. The rotatable joint 200 is similar in principle to the rotatable joint 100 of the first embodiment. However, a washer 19 is disposed between a ball joint 41 of the rotatable arm 20 and the flange portion 235 of the supporting shaft 23. After the rotatable joint 200 is assembled, the washer 19 surrounds the supporting shaft 23 and abuts the flange portion 235 of the supporting shaft 23 so as to prevent the flange portion 235 from directly touching the rotatable arm 20. Thus, abrasion of the flange portion 235 is decreased, and the useful life of the supporting shaft 23 will be increased.

Figure 5:
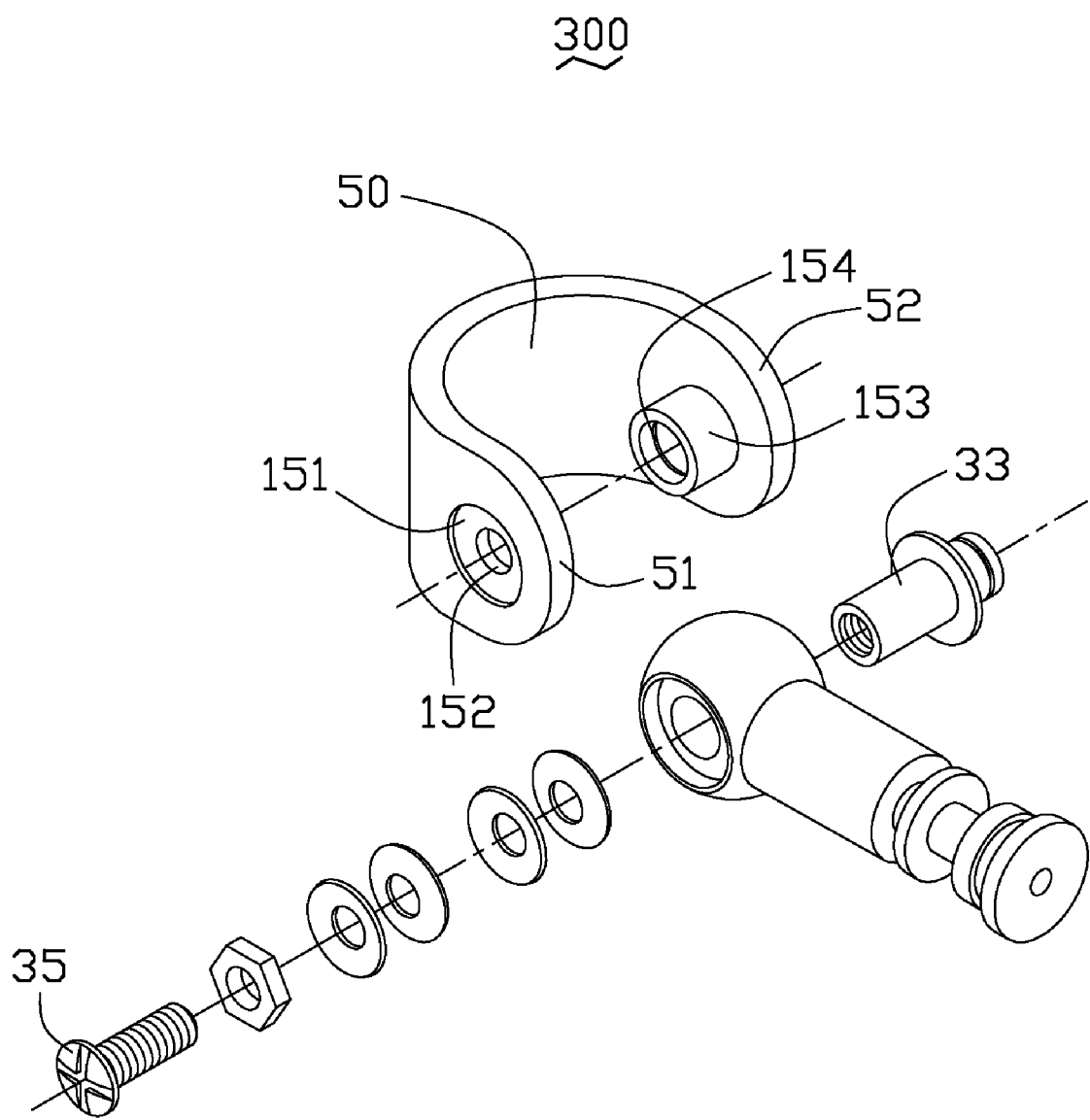
FIG. 5 is an exploded, isometric view of the rotatable joint in accordance with a third embodiment of the present invention.

Referring to FIG. 5, a rotatable joint 300 in accordance with a second embodiment is shown. The rotatable joint 300 includes a supporting shaft 33 and a fastening member 35. The rotatable joint 300 is similar in principle to the joint 100 of the first embodiment. However, the rotatable joint 300 includes a U-shaped body 50 instead of a socket. The U-shaped body 50 includes a first sidewall 51 and a second sidewall 52. The first sidewall 51 is parallel to the second sidewall 52. A through hole 152 and a circular groove 151 communicating with the through hole 152 are defined in the first sidewall 51. The U-shaped body 50 further includes a shaft receptacle 153 extending from an inner surface of the second sidewall 52. The shaft receptacle 153 is configured to fix the supporting shaft 33. The shaft receptacle 153 is substantially a cylinder defining a pivot hole. The shaft receptacle 153 includes a latching rim 154 fixed in the pivot hole. The latching rim 154 is configured to fix the supporting shaft 33 in the pivot hole of the shaft receptacle 153. The U-shaped body 50 is more convenient to manufacture than the joint 100 in the first embodiment. Thus, the cost of the U-shaped body 50 is lower than that of the joint 100.

It should be understood that, the fixing portion 115 of the socket 10 can also be fixed to the actuating portion of the mechanical device, and the rotatable arm 20 can also be rotatably attached to the supporting portion of the mechanical device. The fixing portion 115 of the socket 10 can also be integrally made with the supporting portion of the mechanical device, and the rotatable arm 20 can also be integrally made with the actuating portion of the mechanical device. The rotatable joint 100 is not limited to use for mechanical devices, it can also be used for connecting an actuating portion and a supporting portion of other similar devices.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rotatable joint, comprising:
 a socket;
 a rotatable arm with a pivot hole defined therein;
 a supporting shaft including a first shaft portion and a second shaft portion, a threaded hole defined in the first shaft portion, the first shaft portion extending through the pivot hole, and the second shaft portion fixed to the socket;

a fastening member including a threaded portion for engaging in the threaded hole of the supporting shaft;

an adjusting member disposed at the threaded portion of the fastening member; and a resilient module disposed between the rotatable arm and the adjusting member for providing an axial resilient force, and the axial resilient force being fine tuned by moving the adjusting member along the threaded portion of the fastening member;

wherein the socket is substantially a hollow spheroid comprising a first half and a second half attached to the first half, and a shaft receptacle extends from an inner surface of the first half for supporting the second shaft portion of the supporting shaft; the rotatable arm comprises a ball joint and an arm extension opposite to the ball joint, two frictional grooves are defined in two opposite sides of the ball joint, the pivot hole is defined through a center of the ball joint communicating between the two frictional grooves, and part of the resilient module is received in one of the frictional grooves, the supporting shaft further comprises a flange portion disposed between the first shaft portion and the second shaft portion, and the flange portion of the supporting shaft engages in the other one of the frictional grooves.

2. The rotatable joint as claimed in claim 1, wherein the first half of the socket comprises a latching protrusion, and a latching groove is defined in the second half of the socket, and the latching protrusion is tightly fitted in the latching groove.

3. The rotatable joint as claimed in claim 1, wherein the shaft receptacle is a cylinder with a pivot hole defined therein, the shaft receptacle comprises a latching rim around a portion of the pivot hole, the second shaft portion of the supporting shaft is a cylinder with a latching groove defined therein, and the latching rim is latched in the latching groove of the supporting shaft.

4. The rotatable joint as claimed in claim 1, wherein a through hole and a circular groove communicating with the through hole are defined in the second half of the socket, and the fastening member comprises a head portion connected to the threaded portion, the head portion is a circular flange configured for engaging in the circular groove of the second half, and the threaded portion extends through the through hole of the second half.

5. The rotatable joint as claimed in claim 1, wherein the ball joint is spherical.

6. The rotatable joint as claimed in claim 1, wherein the arm extension includes an engaging groove defined around a cylindrical end of the arm extension.

7. The rotatable joint as claimed in claim 1, further comprising a washer disposed between the ball joint of the rotatable arm and the flange portion of the supporting shaft.

8. The rotatable joint as claimed in claim 1, wherein the adjusting member is a nut with a threaded hole defined therein.

9. The rotatable joint as claimed in claim 1, wherein the resilient module includes two pairs of resilient rings, each of the resilient rings are generally plate-shaped, the pair of resilient rings abut each other, and are oriented symmetrically opposite to each other.

10. A rotatable joint used for a mechanical device, comprising:

a U-shaped body includes a first sidewall with a through hole defined therein and a second sidewall;

a rotatable arm disposed between the first sidewall and the second sidewall, and a pivot hole defined in the rotatable arm;

a supporting shaft including a first shaft portion and a second shaft portion, a threaded hole defined in the first shaft portion and the first shaft portion extending through the pivot hole, the second shaft portion fixed to the second sidewall;

a fastening member including a threaded portion, and the threaded portion being inserted through the through hole of the U-shaped body and engaging in the threaded hole of the supporting shaft;

an adjusting member disposed at the threaded portion of the fastening member; and a resilient module disposed between the rotatable arm and the adjusting member for providing an axial resilient force, and the axial resilient force being fine tuned by moving the adjusting member along the threaded portion of the fastening member;

wherein the rotatable arm comprises a ball joint and an arm extension opposite to the ball joint, two frictional grooves are defined in two opposite sides of the ball joint, the pivot hole is defined through a center of the ball joint communicating with the two frictional grooves, and part of the resilient module is received in one of the frictional groove, the supporting shaft further includes a flange portion disposed between the first shaft portion and the second shaft portion, and the flange portion of the supporting shaft engages in the other one of the frictional grooves.

11. The rotatable joint as claimed in claim 10, wherein the U-shaped body includes a shaft receptacle extending from an inner surface of the second sidewall, the shaft receptacle is configured to fix the second shaft portion of the supporting shaft.

12. The rotatable joint as claimed in claim 11, wherein the shaft receptacle is a cylinder with a pivot hole defined therein, the shaft receptacle comprises a latching rim around a portion of the pivot hole, and the second shaft portion of the supporting shaft is a cylinder with a latching groove defined therein, and the latching rim engages in the latching groove of the supporting shaft.

13. The rotatable joint as claimed in claim 10, wherein the U-shaped body comprises a circular groove communicating with the through hole defined in the first sidewall thereof, the fastening member includes a head portion adjoining threaded portion, and the head portion is substantially a circular flange configured for engaging in the circular groove of the first sidewall.

14. The rotatable joint as claimed in claim 10, wherein the ball joint is spherical and an engaging groove is defined in a cylindrical end of the arm extension.

15. The rotatable joint as claimed in claim 10, further comprising a washer disposed between the ball joint of the rotatable arm and the flange portion of the supporting shaft.

16. The rotatable joint as claimed in claim 10, wherein the adjusting member is a nut with a threaded hole defined therein.

17. The rotatable joint as claimed in claim 10, wherein the resilient module includes two pairs of resilient rings, each of the resilient rings are generally plate-shaped, the pair of resilient rings abut each other, and are oriented symmetrically opposite to each other.

* * * * *